Aug. 7, 1934.  C. J. HARDISON  1,968,828
AUTOMATIC OIL AND TEMPERATURE CONTROL SYSTEM FOR MOTOR VEHICLES
Filed March 23, 1933  2 Sheets-Sheet 1
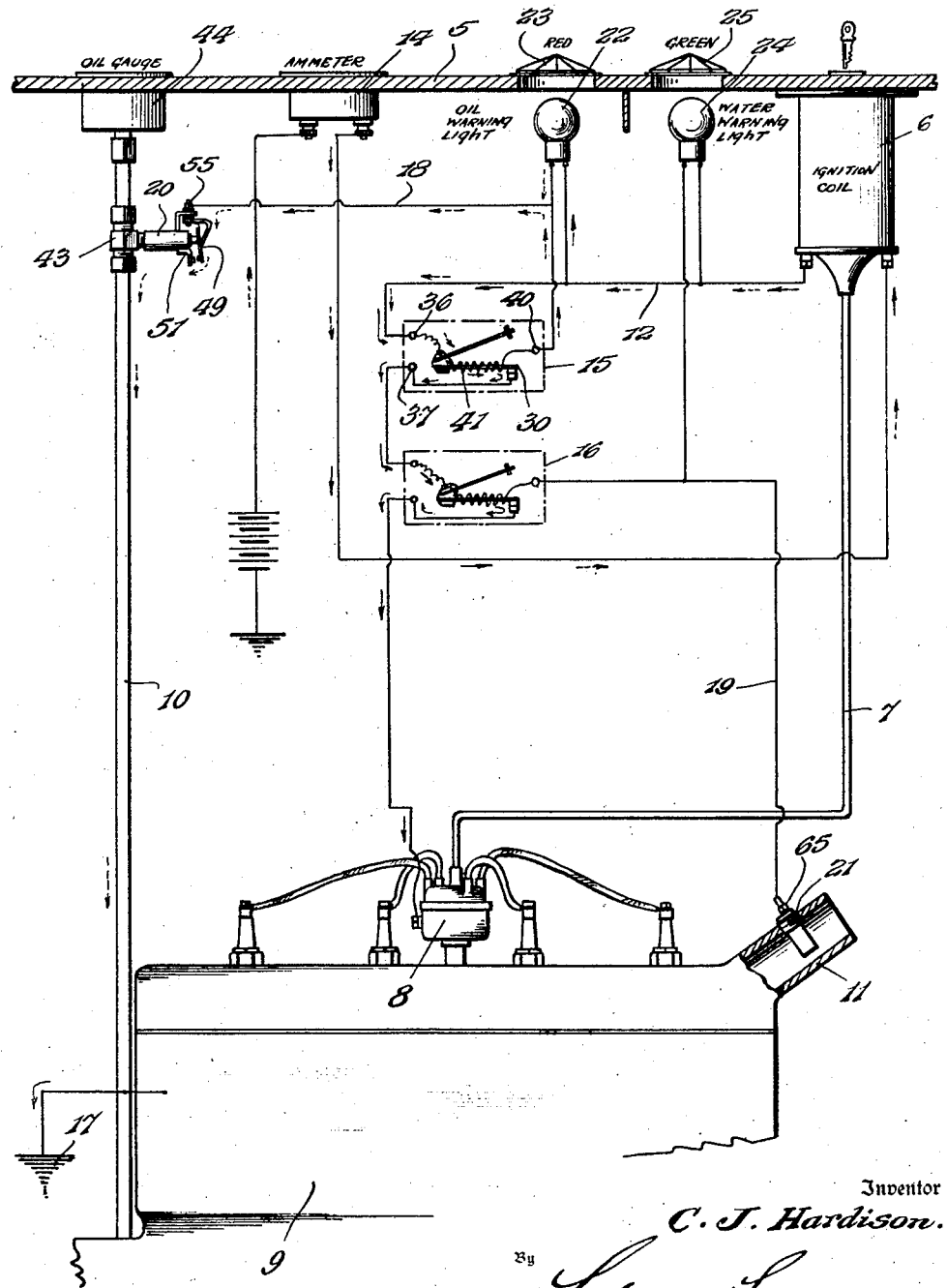
Inventor
C. J. Hardison.
By
Lacey & Lacey, Attorneys Aug. 7, 1934.  C. J. HARDISON  1,968,828
AUTOMATIC OIL AND TEMPERATURE CONTROL SYSTEM FOR MOTOR VEHICLES
Filed March 23, 1933  2 Sheets-Sheet 2
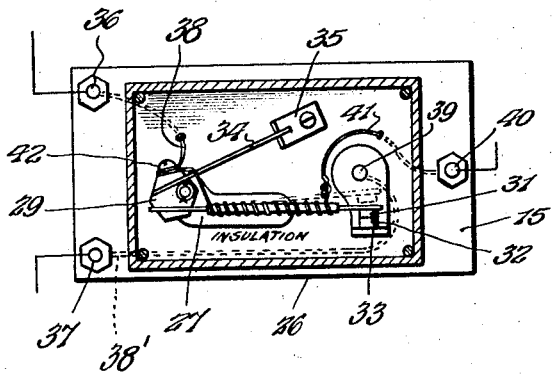
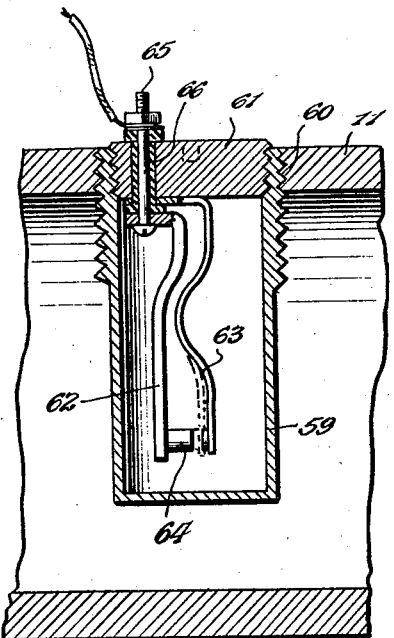
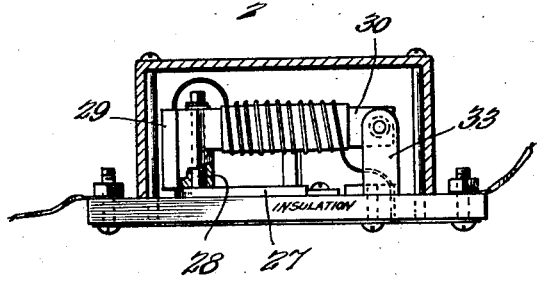
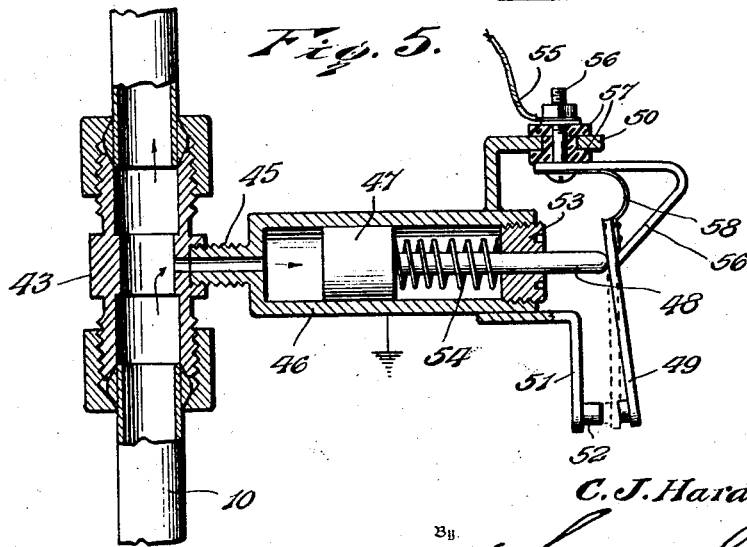
Inventor
C. J. Hardison.
By Lacey & Lacey
Attorneys Patented Aug. 7, 1934

1,968,828

UNITED STATES PATENT OFFICE 1,968,828

AUTOMATIC OIL AND TEMPERATURE CONTROL SYSTEM FOR MOTOR VEHICLES

Charles Jerome Hardison, St. Petersburg, Fla., assignor of fifty-one per cent to Maxey D. Moody, Jacksonville, Fla.; Betty Hardison administratrix of said Charles J. Hardison, deceased Application March 23, 1933, Serial No. 662,401

6 Claims. (Cl. 123—146.5)

This invention relates to automatic oil and temperature control systems for the power units of automobiles and other motor driven conveyances.

The object of the invention is to provide novel means for automatically stopping the engine of a motor vehicle should for any reason the pressure or level of the oil in the lubricating system become so low or the temperature of the fluid in the cooling system so high as to endanger the bearings, cylinder walls and other parts of said engine.

A further object of the invention is to provide an automatic system including coacting thermal switches connected in series with the primary motor circuit, one of said switches being responsive to the current strength to successively illuminate a warning light on the dash board of a motor vehicle and stop the engine thereof when the flow of oil is interrupted or diminished and the other being successively responsive to illuminate a similar warning light and stop the engine when the temperature of the fluid in the cooling system becomes excessive.

A still further object of the invention is to provide an automatic motor cut out system which is simple in construction and thoroughly efficient in operation and which may be readily installed on any type of motor driven conveyance at a minimum expense.

In the accompanying drawings forming a part of this specification:

Figure 1 is a diagrammatic view of an automatic oil and temperature control system embodying the invention and showing it applied to the engine of a motor vehicle of conventional construction.

Figure 2 is a transverse sectional view of one of the thermal switches.

Figure 3 is a vertical sectional view of the same.

Figure 4 is a vertical sectional view of the automatic switch or cut out for the cooling system.

Figure 5 is a vertical sectional view of the fluid pressure switch for the lubricating system.

Similar numerals of reference indicate corresponding parts in all the figures of the drawings.

The improved automatic control system forming the subject matter of the present invention is principally designed for installation on automobiles and other motor driven conveyances and by way of illustration is shown in connection with a portion of an automobile of standard construction in which 5 indicates the dash board, 6 the ignition coil, 7 the high tension cable leading to the distributor 8 mounted on the engine 9, and 10 and 11 portions of the lubricating and cooling systems respectively.

The system comprises a primary circuit 12, one terminal of which is connected with a battery 13 leading to an ammeter 14 on the dash board, and thence extends to the primary side of the ignition coil 6 and through thermal switches 15 and 16 to the distributor, and thence to the ground, indicated at 17. Connected in shunt with the primary circuit are auxiliary circuits 18 and 19, the circuit 18 extending to a control switch 20 connected with the lubricating system 10 and the auxiliary circuit 19 being connected with a control switch 21 connected with the cooling system 11. Interposed in the auxiliary circuit 18 is a warning light 22 arranged at the rear of a colored lens 23, preferably red, mounted on the dash of the automobile, there being a similar warning light 24 arranged adjacent the dash and at the rear of a colored lens or disc 25, preferably green, the purpose of said lights being to indicate when the oil in the lubricating system falls below a predetermined pressure or the fluid in the cooling system rises above a predetermined temperature.

The thermal switches 15 and 16 are illustrated in detail in Figures 2 and 3 of the drawings and as said switches are identical in construction a detailed description of one will suffice for both. Each thermal switch comprises a base 26 of bakelite, or other insulating material having a metal plate 27 mounted thereon and provided with an upstanding lug 28 on which is mounted for turning movement a metallic stud 29 preferably of angular formation and to which is secured one end of a switch arm 30 having a terminal contact member 31 thereon which coacts with a similar contact member 32 mounted on an upstanding bracket 33 secured to the base, as shown. The contacts 31 and 32 are normally closed and in order to hold them in closed position a leaf spring 34 is provided, one end of which is secured to the stud 29 and the other end of the spring being fastened in a slotted bracket or anchoring member 35. At one end of the base 26 are spaced binding posts 36 and 37 to one of which is secured a conductor 38 leading to the stud 29, the other binding post 37 having a conductor 38' connected therewith and leading to the base 39 of the bracket 33. Disposed at the end of the base opposite the binding posts 36 and 37 is a single binding post 40 to which is secured a relatively fine resistance wire 41, the intermediate portion of which is coiled or wrapped around the switch arm 30 and is connected with the adjacent end of the conductor 38 as indicated at 42. The purpose of the wire 41 is to heat the switch arm 30 and expand the same and thus break the contact between the members 31 and 32 so as to interrupt the primary circuit and automatically stop the engine under certain conditions, as will be more fully explained hereinafter. The primary circuit 12 is connected to the binding posts 36 and 37 of the respective thermal switches so that said switches are connected in series in said primary circuit while the heating coil 41 of one of the thermal switches is connected in the shunt circuit 18 and the coil 41 of the other thermal switch is connected in the auxiliary or shunt circuit 19.

The control switch for the lubricating system is shown in detail in Figure 5 of the drawings and comprises a relatively short pipe section 43, one end of which is connected with the oil line 10 of the lubricating system and the other end thereof connected with an oil gauge 44. Threaded in the pipe section 43 is the reduced nipple 45 of a fluid pressure cylinder 46 having a piston 47 operating therein and provided with a stem 48, the free or outer end of which engages a switch arm 49 carried by an overhanging bracket 50 projecting laterally from the cylinder as shown. Secured to the cylinder 46 is a coacting switch arm 51, the arms 49 and 51 being provided with terminal contacts 52 which are normally held in open position by the pressure of the oil in the lubricating system acting on the piston 47. Interposed between the piston 47 and a closure plug 53 at the end of the cylinder is a coil spring 54, the purpose of which is to retract the piston 47 and permit the members 52 to contact and thus close the auxiliary circuit 18 should the flow of oil in the lubricating system for any reason be interrupted or should the oil in the lubricating system fall below the predetermined pressure.

The auxiliary or shunt circuit 18 is connected at 55 with a binding screw 56 on the overhanging arm 50 and secured to the lower face of said arm is a stop member 56, the purpose of which is to limit the outer or opening movement of the switch arm 49. Insulating washers 57 are interposed between the stop member 56 and overhanging arm 50 as well as between the arm 50 and the nut of the binding screw 56, there being a spring 58 electrically connected with the stop member 56 and switch arm 49 for imparting the desired resiliency to said switch arm.

As the auxiliary circuit 18 is electrically connected with the control switch 20 and as the contact members of the control switch are normally open and held in open position by the pressure of the oil in the lubricating system, it follows that upon a diminution of the flow of oil in the lubricating system the spring 54 will retract the piston, thereby causing the contact members of the switch to engage and close the auxiliary circuit through the oil warning light 22.

The control switch 21 for the cooling system is illustrated in detail in Figure 4 of the drawings and comprises a cylindrical body 59, the upper end of which is threaded at 60 within the pipe or conduit 11 of the cooling system while the other end thereof is closed and extends within the path of the fluid flowing through the circuit. The cylinder 59 is normally closed by a plate or disc 61 threaded in the upper end of said cylinder and carrying coacting switch arms 62 and 63 having terminal contact members 64 normally held out of contact with each other, the switch arm 63 being constructed of metal sensitive to the influence of heat so as to expand the same and close the switch when the fluid in the cooling system rises above a predetermined temperature. The switch arms 62 and 63 are secured to the head or disc 61 by a binding screw 65 to which one terminal of the auxiliary circuit 19 is connected, there being suitable insulating material 66 fitted about the binding screw 65 in order to prevent a short circuit.

The operation of the device is as follows:

Under normal conditions, the control switches 20 and 21 are open and the primary circuit to the engine closed so that the engine is free to operate in the usual manner. Should, however, the flow of oil in the lubricating system become obstructed for any reason or the oil fall below a predetermined pressure, the spring 54 will retract the piston 48 thereby causing the members 52 to contact with each other and close the auxiliary circuit 18, in which event a portion of the current will flow through the warning light 22 and illuminate the same so as to indicate to the driver that the lubricating system is out of order. When the auxiliary or shunt circuit 18 is closed, a portion of the current will flow through the wire 12 to the binding post 36 of the thermal switch 15 and thence through the coil 41 to heat the switch arm 30. As the switch arm becomes heated it will expand and open the primary circuit, thereby automatically stopping the engine. It will thus be seen that the thermal switch 15 acts to first illuminate the warning light and then automatically stop the engine.

Should the fluid in the cooling system become overheated from any cause or rise beyond a predetermintd temperature, the members 64 will contact and close the auxiliary circuit 19 and actuate the thermal switch 16 to first illuminate the warning signal 24 and subsequently break the primary circuit and automatically stop the engine. It will, of course, be understood that the control switches 20 and 21 may be set to act upon any desired diminution in the oil pressure or increase in the temperature of the fluid respectively and that the thermal switches 15 and 16 may be so timed as to open at any predetermined interval. From the foregoing description it is thought that the construction and operation of the device will be readily understood by those skilled in the art and further description thereof is deemed unnecessary.

It will, of course, be understood that my improved control system may be used in connection with magneto systems of motor ignition as well as distributer and coil systems without departing from the spirit of the invention.

It will also be understood that the control system may be used with good results on other equipment such as stationary engines, tractors, draglines and the like.

Having thus described the invention, what I claim is:

1. The combination with the ignition devices of an internal combustion engine and the cooling and lubricating system thereof, of a normally closed primary circuit, shunt circuits connected with the primary circuit and said cooling and lubricating system and including normally open control switches movable to closed position upon a predetermined drop in the oil pressure of the lubricating system or a predetermined rise in the temperature of the cooling system, warning signals in the shunt circuits, and thermal switches in the primary circuit responsive to illuminate the warning signals and automatically stop the engine when the control switches are closed.

2. The combination with the ignition devices of an internal combustion engine and the cooling and lubricating system thereof, of a primary circuit, normally open auxiliary circuits connected in shunt with the primary circuit and with the lubricating and cooling system respectively, warning signals in the shunt circuits, and thermal switches connected in series with the primary circuit, one of said thermal switches being actuated to illuminate one of the warning signals and stop the engine when one of the auxiliary circuits is closed by a drop in pressure of the oil in the lubricating system and the other thermal switch being actuated to light the other warning signal and stop the engine when the other auxiliary circuit is closed upon a predetermined rise in the temperature of the cooling system.

3. The combination with the ignition devices of an internal combustion engine and the cooling and lubricating system thereof, of a normally closed primary circuit, shunt circuits connected with the primary circuit and said cooling and lubricating system and including normally open control switches movable to closed position upon a predetermined drop in the oil pressure in the lubricating system or a predetermined rise in the temperature of the cooling system, visual warning signals in the shunt circuits, and normally closed thermal switches connected in series with the primary circuit, one of said thermal switches being actuated to first illuminate one of the warning signals and subsequently break the primary circuit and automatically stop the engine when one of the shunt circuits is closed, and the other thermal switch being actuated to first illuminate the other warning signal and then break the primary circuit and automatically stop the engine when the other shunt circuit is closed.

4. The combination with the ignition devices of an internal combustion engine and the cooling and lubricating system thereof, of a normally closed primary circuit, shunt circuits connected with the primary circuit and said cooling and lubricating systems and including normally open control switches movable to closed position upon a predetermined drop in the oil pressure in the lubricating system or a predetermined rise in the temperature of the cooling system, warning signals in the shunt circuits, thermal switches connected in the primary circuit and each including normally separated contacts, means for heating one of the contacts, and means whereby when either control switch is closed a warning signal will be actuated and a contact of one of the thermal switches heated to expand the same and break the primary circuit thereby to automatically stop the engine.

5. The combination with the ignition devices of an internal combustion engine and the cooling and lubricating systems thereof, of a normally closed primary circuit connected with the ignition devices and said engine, shunt circuits connected with the primary circuit and said cooling and lubricating systems and including normally open control switches movable to closed position upon a predetermined drop in the oil pressure of the lubricating system or a predetermined rise in the temperature of the cooling system, warning signals in the shunt circuits, and means in the primary circuit adapted to successively actuate the warning signals and open the primary circuit to automatically stop the engine upon a drop in the oil pressure of the lubricating system or a rise in the temperature of the cooling system.

6. The combination with the ignition devices or an internal combustion engine and the cooling and lubricating systems thereof, of a primary circuit, shunt circuits connected with the primary circuit and said cooling and lubricating systems and including control switches movable to operative position upon a predetermined drop in the oil pressure of the lubricating system or a predetermined rise in the temperature of the cooling system, warning signals in the shunt circuits, and thermal switches in the primary circuit responsive to illuminate the warning signals and automatically stop the engine when the control switches are actuated.

CHARLES J. HARDISON. [L. S.]